United States Patent [19]
Matsui et al.

[11] Patent Number: 5,331,424
[45] Date of Patent: Jul. 19, 1994

[54] FACSIMILE SYSTEM

[75] Inventors: Tsunehiro Matsui; Yoshihiro Maei; Tadahiko Ikegaya; Takashi Sakayama; Yasuhiro Kamiyama, all of Saitama, Japan

[73] Assignee: Fuji Xerox Co., Ltd., Tokyo, Japan

[21] Appl. No.: 893,401

[22] Filed: Jun. 3, 1992

[30] Foreign Application Priority Data

Jun. 4, 1991 [JP] Japan ................. 3-159405

[51] Int. Cl.$^5$ .......................... H04N 1/21; H04N 1/44
[52] U.S. Cl. ................................................. 358/404
[58] Field of Search ............... 358/400, 404, 406, 500, 358/501, 504, 524, 530

[56] References Cited

U.S. PATENT DOCUMENTS

| | | | |
|---|---|---|---|
| 4,833,595 | 5/1989 | Iijima | 364/200 |
| 5,105,284 | 4/1992 | Sakata et al. | 358/404 |

FOREIGN PATENT DOCUMENTS 1-91378  6/1989  Japan .

Primary Examiner—Bentsu Ro
Attorney, Agent, or Firm—Finnegan, Henderson Farabow, Garrett & Dunner

[57] ABSTRACT

A facsimile system comprises: an image memory for storing received image data and image data to be transmitted; means for detecting a remaining memory capacity in the image memory; means for storing document data of each of the received image data and the image data to be transmitted; means for enciphering at least a part of image data stored in the image memory upon detection of an insufficient remaining memory capacity by the remaining memory capacity detection means; means for recording the enciphered image data on a recording sheet together with the document data thereof; means for reading the recorded enciphered image data; and means for deciphering the read enciphered image data.

7 Claims, 6 Drawing Sheets

FACSIMILE SYSTEM

BACKGROUND OF THE INVENTION

This invention relates to a facsimile system, particularly to a facsimile system with a function for storing image data.

Facsimile systems having an image memory for storing image data (hereinafter abbreviated as the "memory FAX") are gaining popularity in recent years. For reception, the memory FAX temporarily stores received image data and prints the stored image data at a desired timing thereafter. For transmission, on the other hand, the memory FAX reads image data to be transmitted by a scanner, temporarily stores the read image data in the image memory, and transmits the stored image data at a desired timing thereafter. Therefore, the communication time can be reduced compared with a conventional system, and the communication fees can likewise be curtailed.

However, the thus configured memory FAX has a problem due to memory capacity restrictions. That is, when a large volume of image data for memory transmission occupies the image memory, or a large volume of received image data takes up the image memory, the remaining memory capacity can no longer be sufficient to execute memory reception.

To overcome this problem, proposed in, e.g., Japanese Patent Unexamined Publication No. 91378/1989 is a system having an enciphering function. In such a system, image data stored in the image memory is enciphered when the remaining memory capacity becomes small and the enciphered image data is printed so that a free memory capacity can be reserved. An operator sets the printed document on an image reader thereafter when the free memory capacity becomes large enough so that the enciphered image data can be deciphered.

The above-mentioned conventional facsimile system, however, addresses the following problems.

(1) Since the content of enciphered image data cannot be read, the image data cannot be identified. That is, whether the image data is for transmission or reception, or to which destination the image data should be transmitted if the image data is for transmission cannot be identified. The image data is likely to be misused and thus it is difficult to manage the image data.

(2) Since the content of enciphered image data cannot be read, a third part, not understanding the message that the image data is to convey, sometimes dumps the image data as an unnecessary document.

(3) Since everybody can decipher image data by using a device to re-read the image data, the confidentiality is hard to be maintained.

(4) Since enciphered image data is printed or read out-of-position when printed on or re-read from a recorded sheet, the finally obtained image data is out of position, too.

(5) Since it is only one enciphering system that is available, the enciphered image data can be deciphered easily.

SUMMARY OF THE INVENTION

The invention has been made in view of the above circumstances. Accordingly, an object of the invention is to improve the operability and user-friendliness of a facsimile system having an enciphering function.

To achieve the above object, the invention is characterized by providing a facsimile system with the following means. The subject facsimile system is a system having such an enciphering function that when the remaining memory capacity of an image memory becomes scarce, image data stored in the image memory is enciphered and printed on a recording sheet as enciphered to ensure a free memory capacity in the image memory and that when the remaining memory capacity becomes sufficient, the enciphered image data is deciphered.

A first aspect of the invention is applied to a facsimile system that includes: means for enciphering image data stored in the image memory upon detection of an insufficient remaining memory capacity and recording the enciphered image data together with corresponding document data thereof; and a means for deciphering only the recorded enciphered image data.

A second aspect of the invention is applied to a facsimile system that includes: means for enciphering image data stored in the image memory upon detection of an insufficient remaining memory capacity and recording the enciphered image data together with corresponding message indicating that the image data has been enciphered; and a means for deciphering only the recorded enciphered image data.

A third aspect of the invention is applied to a facsimile system that includes: means for enciphering a first password specific to the system and image data stored in the image memory upon detection of an insufficient remaining memory capacity and recording the enciphered first password and the enciphered image data; a means for inputting a second password; and means for reading the enciphered image data and the enciphered first password and deciphering the enciphered image data when the first password coincides with the second password.

A fourth aspect of the invention is applied to a facsimile system that includes: means for enciphering image data stored in the image memory and a first password corresponding to the image data upon detection of an insufficient remaining memory capacity and recording the enciphered image data and the enciphered first password; a means for inputting a second password; and means for deciphering the read enciphered image data when the first password coincides with the second password.

A fifth aspect of the invention is applied to a facsimile system that includes: means for enciphering image data stored in the image memory upon detection of an insufficient remaining memory capacity and recording the enciphered image data together with reference position data; means for reading the enciphered image data and the reference position data, deciphering the enciphered image data, and storing the deciphered image data in the image memory; and means for correcting coordinate positions of the deciphered image data in the image memory based on the stored reference position data.

A sixth aspect of the invention is applied to a facsimile system that includes: means for enciphering image data stored in the image memory and job data thereof upon detection of an insufficient remaining memory capacity and recording the enciphered image data and the job data; means for reading and deciphering the enciphered image data and the enciphered job data; and a means for storing the deciphered image data in a stored area in the image memory based on the read enciphered job data.

A seventh aspect of the invention is applied to a facsimile system that includes: a means for enciphering image data stored in the image memory by one of a plurality of enciphering systems upon detection of an insufficient remaining memory capacity; a means for recording identification data indicating the selected enciphering system together with the enciphered image data; means for reading the recorded enciphered image data and job data and deciphering the enciphered image data by a deciphering system corresponding to the read identification data.

According to the first aspect of the invention, enciphered image data can be managed by referencing document data recorded together with the enciphered image data, thereby preventing the misuse of the enciphered image data.

According to the second aspect of the invention, the fact that image data has been enciphered can be recognized by a message recorded together with the image data, thereby preventing the misuse or destruction of image data by a third party.

According to the third and fourth aspects of the invention, enciphered image data is not deciphered unless an enciphered first password recorded together with the enciphered image data coincides with a second password inputted by an operator, thereby allowing a high degree of confidentiality to be maintained.

According to the fifth aspect of the invention, the relative position between reference position data and image data is maintained constant. Thus, if the coordinate positions of the image data are corrected in accordance with the coordinate positions of the reference position data in the image memory, the image data can be stored in the appropriate coordinate positions, thereby preventing the image data from being out of position during recording.

According to the sixth aspect of the invention, the mode of storing deciphered image data in the image memory is determined by job data recorded together with the enciphered image data, thereby simplifying the processing of storing the deciphered image data in the image memory again.

According to the seventh aspect of the invention, image data is enciphered by one of a plurality of enciphering systems, thereby allowing a high degree of confidentiality to be maintained. Moreover, the selected enciphering system is specified by identification data, which is then used to automatically select a deciphering system corresponding to the enciphering system, thereby preventing the operation performed by an operator from becoming complicated.

DETAILED DESCRIPTION OF THE PREFERRED EMBODIMENTS

The invention will now be described in detail with reference to the accompanying drawings.

Figure 10:
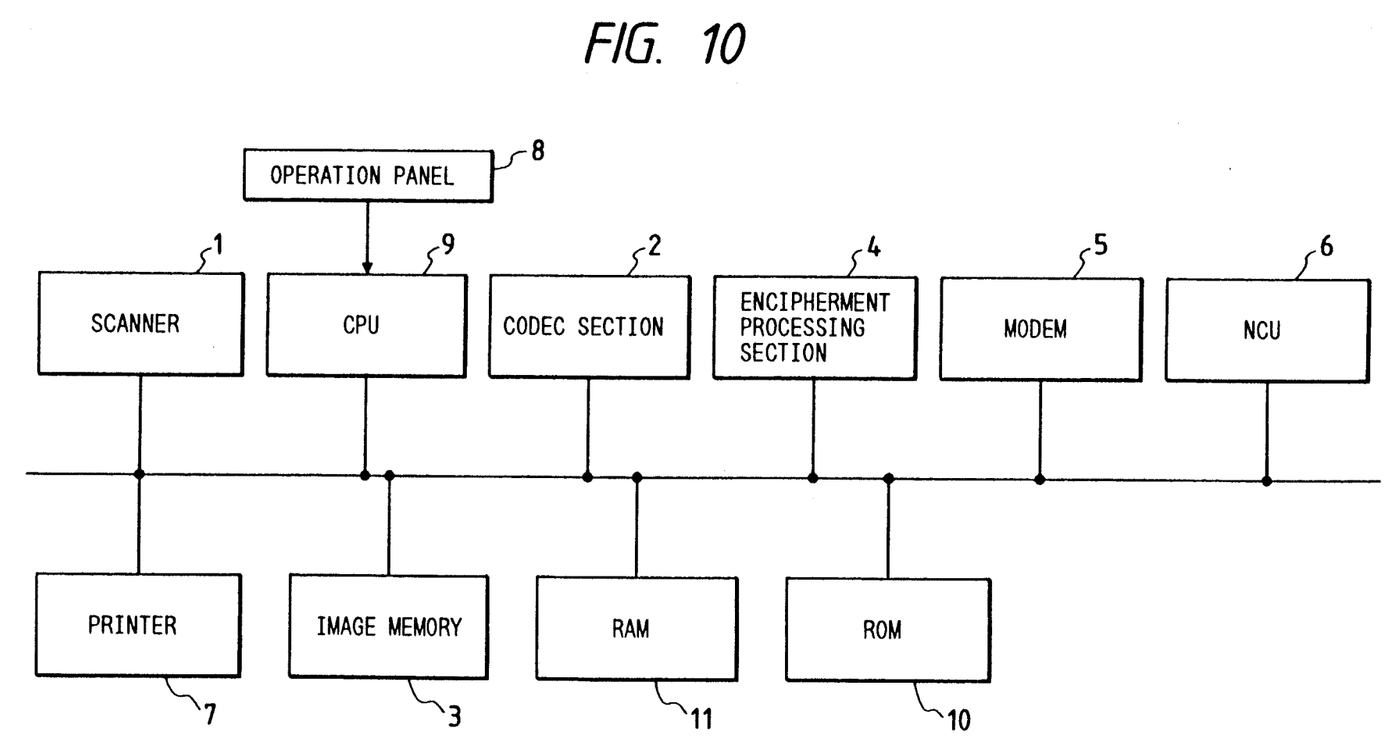
FIG. 10 is a block diagram of a facsimile system to which the invention is applied.

FIG. 10 is a schematic block diagram of a facsimile system having an enciphering function to which the invention is applied.

In FIG. 10, a scanner 1 reads document data and converts the read document data into image data in the form of an electric signal. A CODEC section 2 encodes the image data and decodes the encoded image data. An image memory 3 stores the encoded image data. An encipherment processing section 4 enciphers the coded image data and deciphers the enciphered image data. A modem 5 modulates image data to be transmitted and demodulates received image data. A line control section (NCU) 6 calls a counterpart station by automatic dialing or executes a predetermined communication procedure by a predetermined protocol when instructed to transmit by a so-called "one-touch dial" or "abbreviated dial."

A printer 7 prints the received image data on a recording sheet. An operation panel 8 has a 10-key section, a function key section, a display section, and the like. A system control section (CPU) 9 controls the operation of the entire facsimile system. A ROM 10 stores control programs, various primary data, and the like for operating this system. A RAM 11 provides a work area and stores data and the like specified from the operation panel 8 by a user.

In the thus configured facsimile system, the image data read from the scanner 1 and the image data received through the NCU 6 are temporarily stored in the image memory 3. Here, as the remaining memory capacity in the image memory 3 is decreased, a part of the image data stored in the image memory 3 is read and transmitted to the encipherment processing section 4, where the transmitted data is enciphered by a predetermined enciphering system. The enciphered image data is sent to the printer 7 and printed on a recording sheet.

On the other hand, when the remaining memory capacity in the image memory 3 is large enough to store the enciphered image data, the enciphered image data printed on the recording sheet is read by the scanner 1. The enciphered image data is transmitted to the encipherment processing section 4, where the transmitted data is deciphered by a predetermined deciphering system. The deciphered image data is then transmitted to the image memory 3 for storage.

Embodiments of the invention will be described in detail below.

Figure 1:
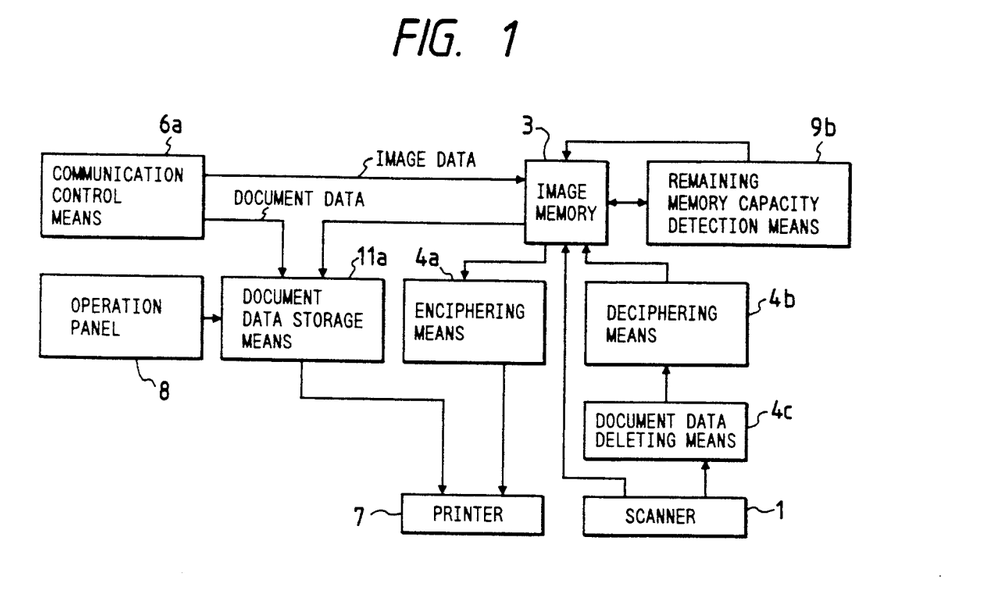
FIG. 1 is a functional block diagram of a first embodiment of the invention.

FIG. 1 is a functional block diagram of a first embodiment of the invention. The same reference numbers and characters as those used above designate the same or like parts and components.

While the facsimile system of the invention has all the functions performed by a conventional facsimile system, only a configuration requisite for the description of the invention is herein presented.

In FIG. 1, a communication control means 6a controls communications with a counterpart station by outputting a protocol signal of the facsimile system. A remaining memory capacity detection means 9b detects a remaining memory capacity in the image memory 3 and instructs the image memory 3 to output the image data when the remaining memory capacity becomes small.

A document data storage means 11a stores not only received image data tied with document data such as the name, telephone number, or confidential box number of a counterpart station, but also transmitting image data inputted from the scanner 1 in correspondence with document data such as the name or telephone number of a counterpart station.

An enciphering means 4a enciphers the image data outputted from the image memory 3 and outputs the enciphered image data. The printer 7 prints the enciphered image data and the document data thereof on a recording sheet. The scanner 1 reads the enciphered image data and the document data on the recording sheet and outputs the read data to a document data deleting means 4c. the document data deleting means 4c deletes the document data read by the scanner 1 and outputs only the enciphered image data to a deciphering means 4b. The deciphering means 4b deciphers the enciphered image data and stores the deciphered image data in the image memory 3 again.

Figure 9A:
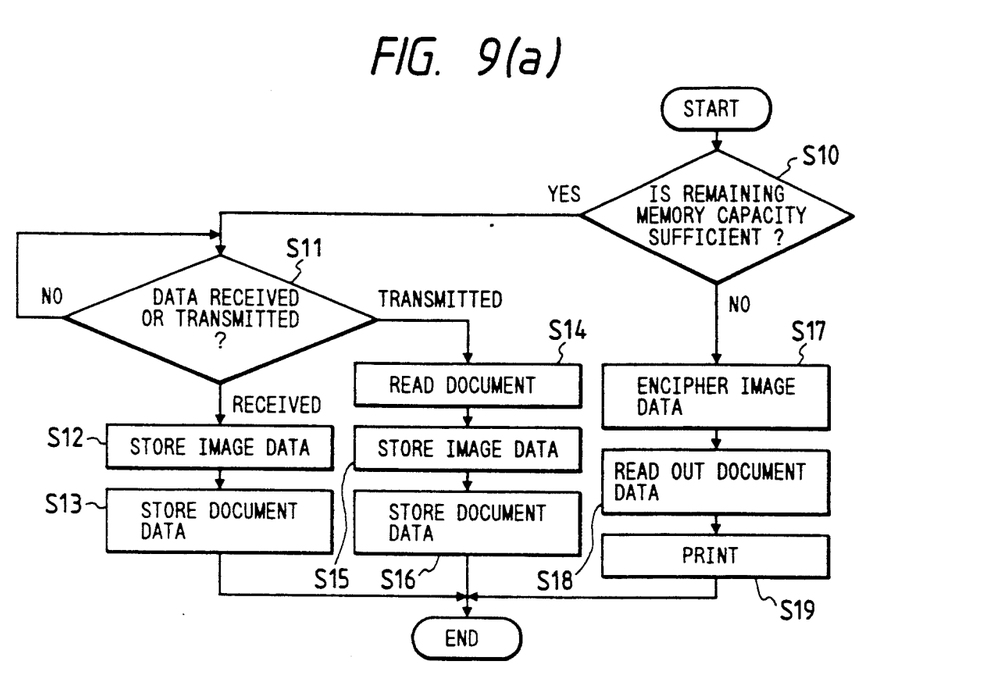
FIGS. 9(a) and (b) are flowcharts illustrative of an operation of the first embodiment of the invention.
Figure 9B:
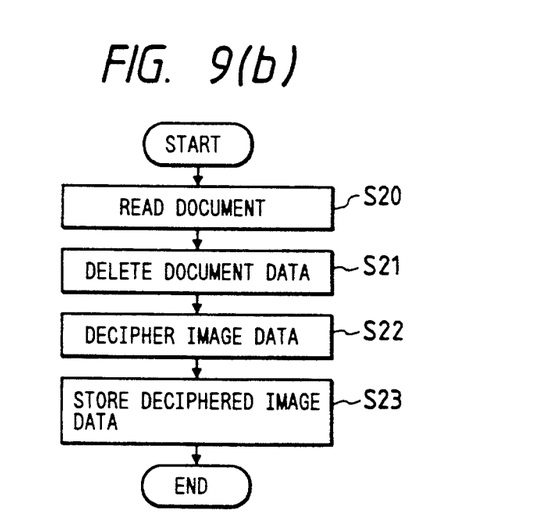

FIGS. 9(a) and 9 (b) are flowcharts illustrative of an operation of the embodiment shown in FIG. 1. Particularly, FIG. 1(a) shows processing for enciphering image data and outputting the enciphered image data when the remaining memory capacity becomes insufficient, while FIG. 1(b) shows processing for storing the enciphered image data in the image memory again.

In FIG. 9(a), the remaining memory capacity in the image memory 3 is detected by the remaining memory capacity detection means 9b in Step S10. If the remaining memory capacity is sufficient, the presence/absence of received data or an instruction for transmission is judged in Step S11.

Here, upon detection of received image data by the communication control means 6a, the processing proceeds from Steps S11 to S 12. In Step S12, the detected image data is stored in the image memory 3, and in Step S13 document data corresponding to that image data is extracted and the extracted document data is stored in the document data storage means 11a.

When an operator sets a document to be transmitted on the scanner 1 and instructs a transmission destination from the operation panel 8, the processing advances from Steps S11 to S14. The document to be transmitted is then read by the scanner 1 in Step S14 and the read data is stored in the image memory 3 in Step S15. In Step S16 data relating to the transmission destination specified from the operation panel 8 is stored in the document data storage means 11a as document data.

On the other hand, upon judgment of an insufficient memory capacity in Step S10, a part of the image data stored in the image memory 3 is outputted in Step S17 and the outputted data is enciphered by the enciphering means 4a. Document data corresponding to the read image data is read from the document data storage means 11a in Step S18. The enciphered image data is printed on a recording sheet together with the corresponding document data by the printer 7 in Step S19.

Also, in FIG. 9(b), when a document with the recorded enciphered image data and the corresponding document data thereof is set on the scanner 1, the document is read by the scanner 1 in Step S20. Only the referencing document data out of the read data is deleted by the document data deleting means 4c in Step S21, and only the enciphered image data is stored by the deciphering means 4b and the deciphered data is then stored in the image memory 3 in Step S22.

According to the first embodiment, when the remaining memory capacity in the image memory 3 becomes insufficient, the image data stored in the image memory 3 is enciphered and the enciphered data is outputted together with the corresponding document data. The document data identifies image data: the type of image data (whether it is image data to be transmitted or received image data), the destination of the image data if the image data is to be transmitted, and the like can be identified. Therefore, document management in the form of enciphered image data is facilitated so as to prevent the misuse of documents.

Figure 2:
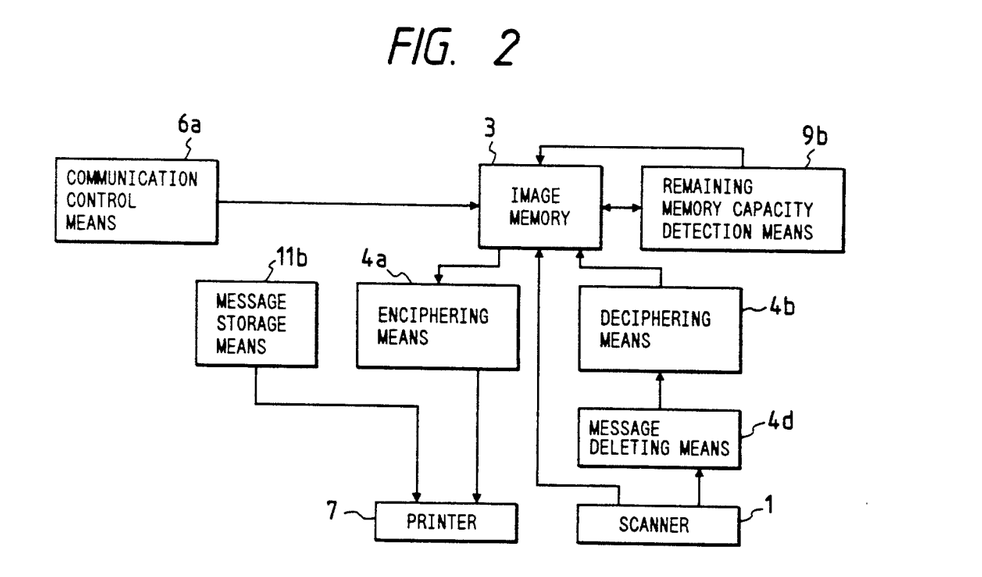
FIG. 2 is a functional block diagram of a second embodiment of the invention.

FIG. 2 is a functional block diagram showing a second embodiment of the invention. The same reference numerals and characters as those used above designate the same or like parts and components.

In FIG. 2, a message storage means 11b has preregistered messages. Each message is printed simultaneously when enciphered image data is recorded on a recording sheet and indicates that a document has the enciphered image data. For example, one such message reads: "Enciphered data is recorded in this document." A message deleting means 4d deletes a message out of the enciphered image data read by the scanner 1 and the corresponding message, and outputs only the enciphered image data to the deciphering means 4b.

In this configuration, when the remaining memory capacity in the image memory 3 becomes insufficient, a part of the image data stored in the image memory 3 is enciphered and the enciphered data is printed on a recording sheet together with the message.

When the document in which the enciphered image data and the message are recorded is read by the scanner 1, only the message, out of the read document data, is deleted by the message deleting means 4d, and only the enciphered image data is deciphered by the deciphering means 4b and the deciphered image data is then stored in the image memory 3.

According to the second embodiment, the enciphered image data is printed together with the message indicating that the image data has been enciphered. This allows a third party to learn that the document has been enciphered, thus preventing the document from being destroyed or lost.

Figure 3:
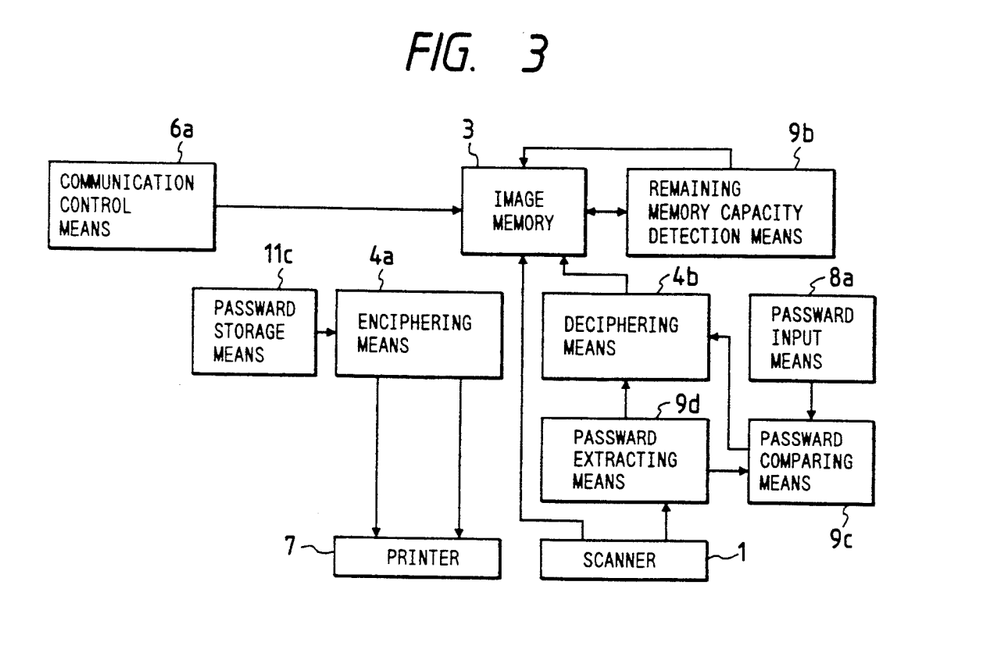
FIG. 3 is a functional block diagram of a third embodiment of the invention.

FIG. 3 is a functional block diagram of a third embodiment of the invention. The same reference numerals and characters as those used above designate the same or like parts and components.

In FIG. 3, a password storage means 11c has a recording of passwords specific to the facsimile system. A password extracting means 9d extracts and deciphers an enciphered password printed on a recording sheet together with enciphered image data. The deciphered password is outputted to a password comparing means 9c, while only the enciphered image data is outputted to the deciphering means 4b.

A password is inputted by an operator from a password inputting means 8a. The password comparing means 9c compares the extracted password with the password inputted by the operator and outputs a result of the comparison to the deciphering means 4b.

In this configuration, when the remaining memory capacity in the image memory 3 becomes insufficient, a part of the image data stored in the image memory 3 and the password stored in the password storage means 11c are outputted to the enciphering means 4a. When the enciphering means 4a enciphers the image data and the password and outputs the enciphered data, the printer 7 prints the enciphered image data and the enciphered password on a recording sheet.

Also, when a document in which the enciphered image data and the enciphered password are recorded is read by the scanner 1, the enciphered password is extracted and deciphered by the password extracting means 9d, and the deciphered password is then outputted to the password comparing means 9c.

Here, when the operator inputs a password from the password inputting means 8a, the password comparing means 9c compares the inputted password with the extracted and deciphered password. If both passwords coincide with each other, the password comparing means 9c permits the deciphering means 4b to decipher the enciphered image data, otherwise, the password comparing means 9c prohibits deciphering. When permitted to decipher, the deciphering means 4b deciphers the enciphered image data outputted from the password extracting means 9d and stores the deciphered image data in the image memory 3.

According to the third embodiment, it is only when a password specifically assigned to the system coincides with a password inputted by an operator that enciphered image data is deciphered. Therefore, a high degree of confidentiality can be maintained.

Figure 4:
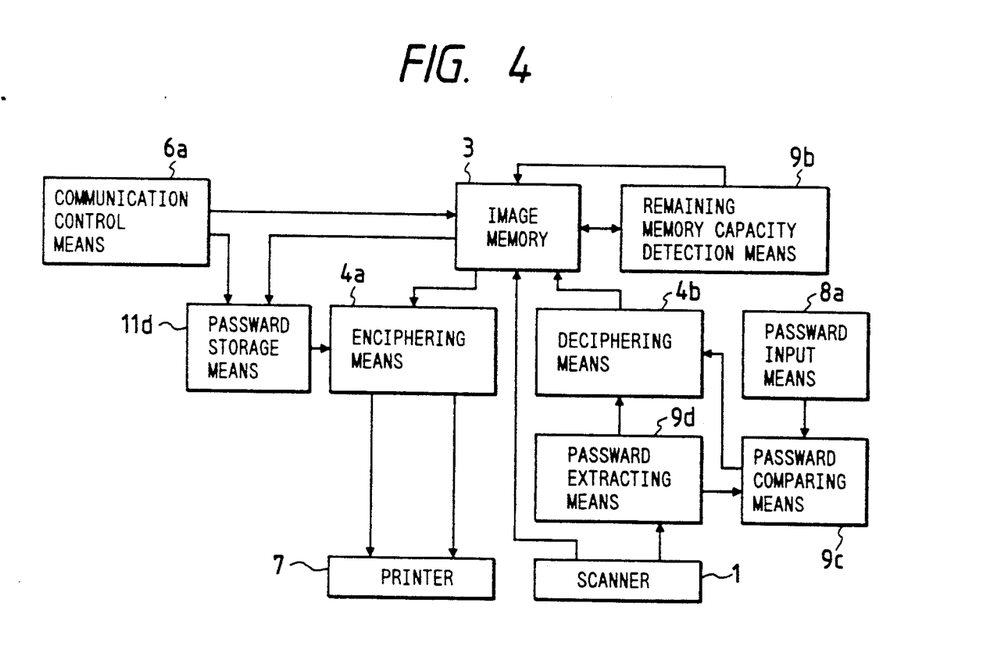
FIG. 4 is a functional block diagram of a fourth embodiment of the invention.

FIG. 4 is a functional block diagram of a fourth embodiment of the invention. The same reference numerals and characters as those used above designate the same or like parts and components.

In FIG. 4, a password storage means 11d stores a password transmitted from a counterpart station while appended to received image data. At this stage, the password is stored as corresponding to the received image data.

In this configuration, when the reception of the image data is detected by the communication control means 6a, the detected image data is stored in the image memory 3 and the password corresponding to the image data is stored in the password storage means 11d.

On the other hand, when the remaining memory capacity in the image memory 3 becomes insufficient, a part of the image data stored in the image memory 3 and the password stored in the password storage means 11d so as to correspond to that image data are outputted to the enciphering means 4a. When the enciphering means 4a enciphers the image data and the password and outputs the enciphered data, the printer 7 prints the enciphered image data and the enciphered password on a recording sheet.

Also, 1 a document in which the enciphered image data and the enciphered password are recorded is read by the scanner 1, the password extracting means 9d extracts and deciphers the enciphered password, and the deciphered password is outputted to the password comparing means 9c.

Here, when an operator inputs a password from the password inputting means 8a, the password comparing means 9c compares the inputted password with the extracted and deciphered password. If both passwords coincide with each other, the password comparing means 9c permits the deciphering means 4b to decipher the enciphered image data, otherwise, the password comparing means 9c prohibits deciphering. When permitted to decipher, the deciphering means 4b deciphers the enciphered image data outputted from the password extracting means 9d and stores the deciphered image data in the image memory 3.

According to the fourth embodiment, it is only when a password specific to the image data coincides with a password inputted by an operator that enciphered image data is deciphered. Therefore, a high degree of confidentiality can be maintained.

While the case where the password extracting means 9d extracts and deciphers the enciphered password and outputs the deciphered password in the third and fourth embodiments, it may be so designed that the deciphering means 4b deciphers the enciphered image data and the enciphered password first, and that the password extracting means 9d extracts the deciphered password thereafter and outputs the extracted password to the password comparing means 9c.

Figure 5:
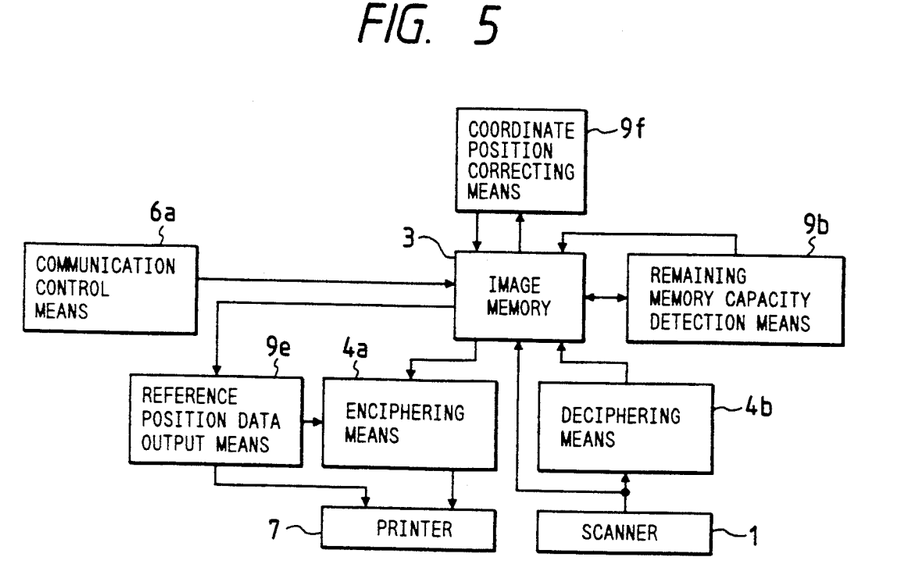
FIG. 5 is a functional block diagram of a fifth embodiment of the invention.

FIG. 5 is a functional block diagram of a fifth embodiment of the invention. The same reference numerals and characters as those used above designate the same or like parts and components.

In FIG. 5, a reference position data outputting means 9e outputs reference position data in correspondence with a timing for reading a predetermined storage area in the image memory 3. A coordinate position correcting means 9f corrects the coordinate positions of image data in the image memory 3 based on the coordinate positions of the reference position data in the image memory 3.

In this configuration, when the remaining memory capacity becomes insufficient, a part of the image data stored in image memory 3 is outputted to the enciphering means 4a. When the enciphering means 4a enciphers the image data and outputs the enciphered image data, the printer 7 prints the enciphered image data and the reference position data outputted from the reference position data outputting means 9e on a recording sheet.

Figure 8:
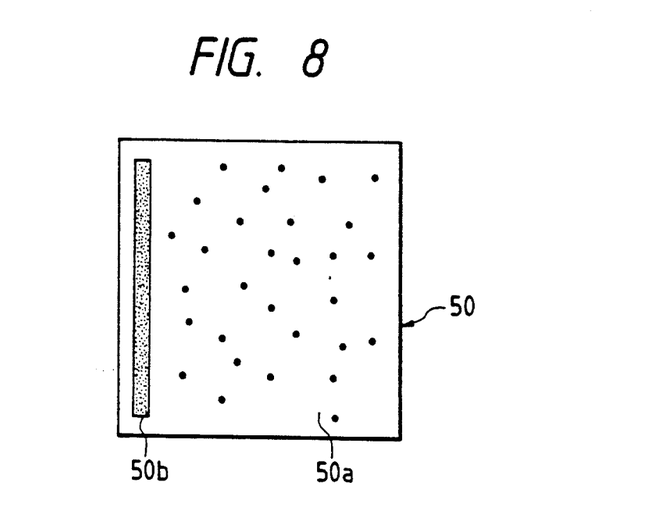
FIG. 8 is a diagram illustrative of a function performed by the fifth embodiment of the invention.

FIG. 8 is a diagram showing an exemplary document 50 in which enciphered image data and reference position data are printed. In this embodiment linearly extending reference position data 50b is recorded at the left end of enciphered image data 50a.

Also, when a document in which the enciphered image data and the reference position data are printed is read by the scanner 1, the deciphering means 4b deciphers only the enciphered image data and stores the deciphered image data in the predetermined area in the image memory 3 together with the reference position data.

The coordinate position correcting means 9f detects the coordinate positions of the reference position data in the image memory 3 and corrects the coordinate positions of the stored image data based on a result of the detection.

According to the fifth embodiment, the relative positions between the reference position data and the image data are maintained constant. Thus, as long as the coordinate positions of the image data can be corrected in accordance with the coordinate positions of the reference position data in the image memory 3, the image data can be stored at appropriate coordinate positions. Therefore, when the image data is read again and printed, the image data will not be out of position.

Figure 6:
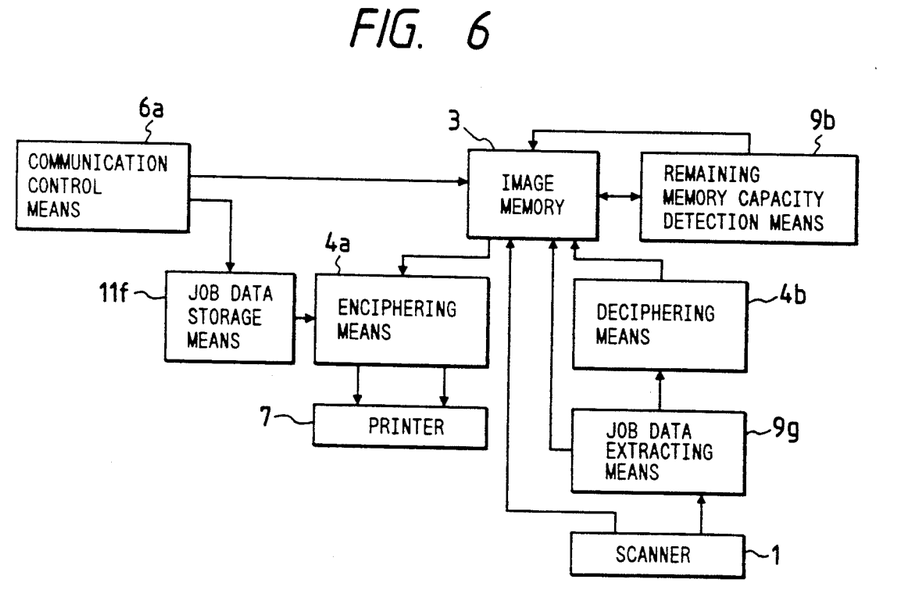
FIG. 6 is a functional block diagram of a sixth embodiment of the invention.

FIG. 6 is a functional block diagram of a sixth embodiment of the invention. The same reference numerals and characters as those used above designate the same or like parts and components.

In FIG. 6, a job data storage means 11f stores job data so as to correspond to image data, the job data being related to received image data and image data to be transmitted. The term "job data" herein used is intended to include: the type of image data, whether the image data is to be transmitted or has been received; the attribute of image data, e.g., whether the image data is to be stored in a confidential box or is ordinary image data; or the data indicating a password of image data if the image data is stored in the confidential box.

A job data extracting means 9g extracts enciphered job data printed on a recording sheet together with enciphered image data, and stores the deciphered image data in an appropriate area in the image memory 3 or together with data indicating the type or attribute of the image data based on the job data.

In this configuration, when the remaining memory capacity in the image memory 3 is judged to be insufficient, a part of the image data stored in the image memory 3 and the job data corresponding to that image data are enciphered by the enciphering means 4a. The enciphered image data and the enciphered job data are then printed on a recording sheet.

Also, when a document in which the enciphered image data and the enciphered job data are recorded is read by the scanner 1, the enciphered job data, out of the read data, is extracted by the job data extracting means 9g and only the enciphered image data is deciphered by the deciphering means 4b. The deciphered image data is then stored in an appropriate mode in the image memory 3 based on the extracted job data so that the image data can be processed accordingly.

According to the fifth embodiment, as enciphered image data is printed together with corresponding job data thereof and the printed document is read by a scanner for appropriate processing of the image data, the image data is stored in the image memory 3 based on the job data in an appropriate mode. Thus, the image data can be processed appropriately while involving no intervention by an operator.

Figure 7:
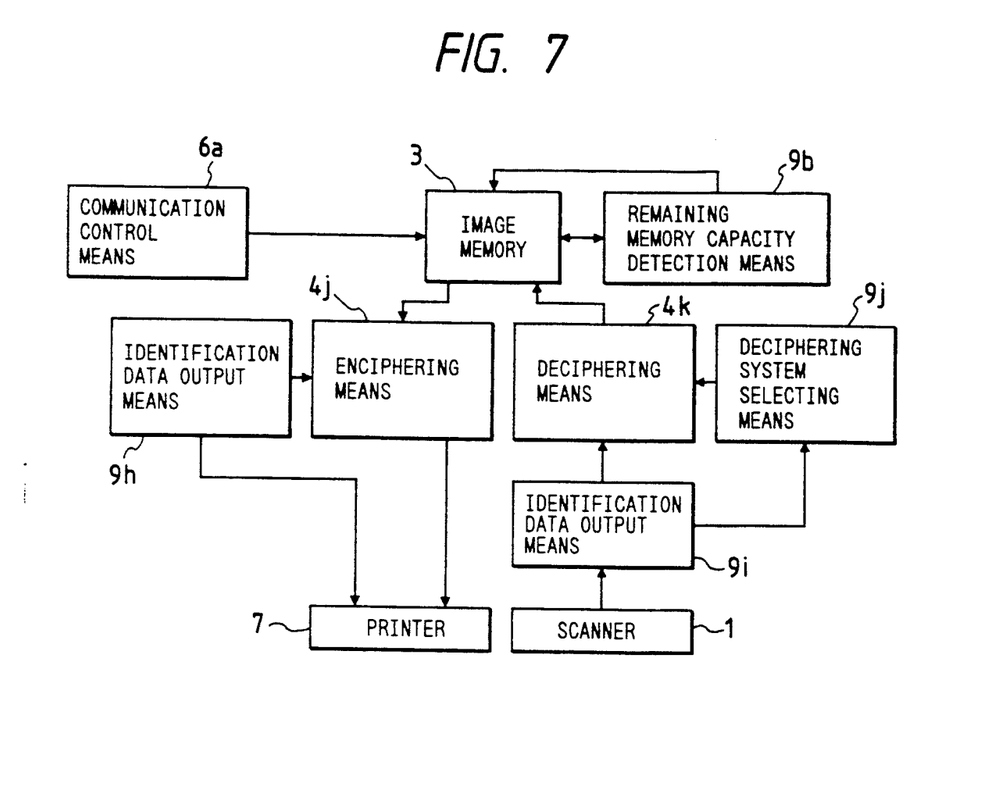
FIG. 7 is a functional block diagram of a seventh embodiment of the invention.

FIG. 7 is a function block diagram of a seventh embodiment of the invention. The same reference numerals and characters as those used above designate the same or like parts and components.

In FIG. 7, an enciphering means 4j has a plurality of different enciphering systems. Upon detection of an insufficient memory capacity by the remaining memory capacity detection means 9b, the enciphering means 4j enciphers image data stored in the image memory 3 by one of the enciphering systems. A deciphering means 4k has a plurality of deciphering systems respectively corresponding to the plurality of enciphering systems and deciphers the enciphered image data by a deciphering system corresponding to the enciphering system executed by the enciphering means 4j.

An identification data output means 9h outputs identification data indicating an enciphering system executed by the enciphering means 4j. An identification data extracting means 9i extracts identification data printed on a recording sheet together with the enciphered image data. A deciphering system selecting means 9j selects a deciphering system executed by the deciphering means 4k based on the extracted identification data.

In this configuration, when the remaining memory capacity becomes insufficient, a part of the image memory stored in the image memory 3 is enciphered by the enciphering means 4j. At this point, the identification data output means 5h outputs identification data indicating the executed enciphering system. The enciphered image data and the identification data are then printed on a recording sheet.

When a document in which the enciphered image data and the identification data are recorded is read by the scanner 1, the identification data is extracted by the identification data extracting means 9i and the extracted identification data is then outputted to the deciphering system selecting means 9j, while only the enciphered image data is outputted to the deciphering means 4k. The deciphering system selecting means 9j judges an enciphering system executed by the enciphering means 4j based on the identification data and selects a deciphering system corresponding to the executed enciphering system. The deciphering means 4k then deciphers the enciphered image data by the deciphering system selected by the deciphering system selecting means 9j.

According to the seventh embodiment, since image data is enciphered by one of a plurality of enciphering systems, a high degree of confidentiality can be maintained. Further, since a selected enciphering system is given by identification data and the identification data is used to automatically select a deciphering system corresponding to the selected enciphering system at the time of deciphering, the operation performed by an operator is not complicated.

While the case where all of the image data deciphered by the deciphering means 4b (4k) are temporarily stored in the image memory has been described in the first, second, third, fourth, and seventh embodiments, the application of the invention is not limited thereto. Deciphered image data may be printed directly by a printer.

As is apparent from the foregoing description, the invention provides a facsimile system having an enciphering function with improved operability and user-friendliness by arranging the facsimile system such that enciphered image data is recorded on a recording sheet together with various types of data when the remaining memory capacity is insufficient and these various data are used for various control.

What is claimed is:

1. A facsimile system comprising:
   an image memory for storing received image data and image data to be transmitted;
   means for detecting a remaining memory capacity in said image memory;
   means for storing document data of each of said received image data and said image data to be transmitted;
   means for enciphering at least a part of image data stored in said image memory upon detection of an insufficient remaining memory capacity by said remaining memory capacity detection means;
   means for recording said enciphered image data on a recording sheet together with said document data thereof;
   means for reading said recorded enciphered image data; and
   means for deciphering said read enciphered image data.

2. A facsimile system comprising:
   an image memory for storing received image data and image data to be transmitted;
   means for detecting a remaining memory capacity in said image memory;

means for enciphering at least a part of image data stored in said image memory upon detection of an insufficient remaining memory capacity by said remaining memory capacity detection means;

means for storing a message indicating that image data has been enciphered;

means, for recording said enciphered image data on a recording sheet together with said message;

means for reading said recorded enciphered image data; and means for deciphering said read enciphered image data.

3. A facsimile system comprising:

an image memory for storing received image data and image data to be transmitted;

means for detecting a remaining memory capacity in said image memory;

means for storing a first password;

means for enciphering at least a part of image data stored in said image memory and said first password upon detection of an insufficient remaining memory capacity by said remaining memory capacity detection means;

means for recording said enciphered image data and said enciphered first password on a recording sheet;

means for reading said recorded enciphered image data and said enciphered first password;

means for inputting a second password;

means for comparing said read first password and said inputted second password; and means for deciphering said read enciphered image data upon judgment that said first password coincides with said second password by said comparing means.

4. A facsimile system comprising:

an image memory for storing received image data and image data to be transmitted;

means for detecting a remaining memory capacity in said image memory;

means for storing a first password corresponding to said received image data;

means for enciphering at least a part of image data stored in said image memory and said first password upon detection of an insufficient remaining memory capacity by said remaining memory capacity detection means;

means for recording said enciphered image data and said enciphered first password on a recording sheet;

means for reading said enciphered image data and said enciphered first password;

means for inputting a second password;

means for comparing said read first password with said inputted second password; and means for deciphering said read enciphered image data upon judgment that said first password coincides with said second password by said comparing means.

5. A facsimile system comprising:

an image memory for storing received image data and image data to be transmitted;

means for detecting a remaining memory capacity in said image memory;

means for enciphering at least a part of image data stored in said image memory upon detection of an insufficient remaining memory capacity by said remaining memory capacity detection means;

means for outputting reference position data;

means for recording said enciphered image data on a recording sheet together with said reference position data;

means for reading said enciphered image data and said reference position data;

means for deciphering said read enciphered image data and storing said deciphered image data in said image memory together with said reference position data; and means for correcting a storage position of said deciphered image data in said image memory based on said stored reference position data.

6. A facsimile system comprising:

an image memory for storing received image data and image data to be transmitted;

means for detecting a remaining memory capacity in said image memory;

means for storing job data of each of said received image data and said image memory to be transmitted;

means for enciphering at least a part of image data stored in said image memory and job data thereof upon detection of an insufficient remaining memory capacity by said remaining memory capacity detection means;

means for recording said enciphered image data and said enciphered job data on a recording sheet;

means for reading said enciphered image data and said job data;

means for reading said enciphered image data and said enciphered job data;

means for deciphering said read enciphered image data; and storage control means for storing said deciphered image data in a predetermined area in said image memory based on said read enciphered job data.

7. A facsimile system comprising:

an image memory for storing received image data and image data to be transmitted;

means for detecting a remaining memory capacity in said image memory;

enciphering means having a plurality of enciphering systems and enciphering at least a part of image data stored in said image memory by one of said plurality of enciphering systems upon detection of an insufficient remaining memory capacity by said remaining memory capacity detection means;

means for outputting identification data indicating said one enciphering system;

means for recording said enciphered image data and said identification data on a recording sheet;

means for reading said recorded enciphered image data and said recorded identification data; and deciphering means having a plurality of deciphering systems corresponding to said plurality of enciphering systems and deciphering said read enciphered image data by one of said plurality of deciphering systems corresponding to said read identification data.

* * * * *